(12) United States Patent
Chou

(10) Patent No.: US 7,689,740 B2
(45) Date of Patent: Mar. 30, 2010

(54) SYSTEM AND METHOD FOR SERIAL-PERIPHERAL-INTERFACE DATA TRANSMISSION

(75) Inventor: Hsiao-Fung Chou, Taipei (TW)

(73) Assignee: Via Technologies, Inc., Taipei (TW)

( * ) Notice: Subject to any disclaimer, the term of this patent is extended or adjusted under 35 U.S.C. 154(b) by 236 days.

(21) Appl. No.: 11/858,382

(22) Filed: Sep. 20, 2007

(65) Prior Publication Data
US 2008/0307126 A1    Dec. 11, 2008

(30) Foreign Application Priority Data
Jun. 7, 2007    (TW) .............. 96120487 A

(51) Int. Cl.
*G06F 3/00* (2006.01)
*G06F 1/04* (2006.01)

(52) U.S. Cl. .............. 710/52; 710/8; 710/36; 713/600

(58) Field of Classification Search ............... None
See application file for complete search history.

(56) References Cited

U.S. PATENT DOCUMENTS 5,615,376 A * 3/1997 Ranganathan ............ 713/322
5,878,276 A * 3/1999 Aebli et al. ............ 710/19
6,311,263 B1 * 10/2001 Barlow et al. ............ 712/36
6,754,784 B1 * 6/2004 North et al. ............ 711/145

* cited by examiner

*Primary Examiner*—Alan Chen
(74) *Attorney, Agent, or Firm*—Thomas, Kayden, Horstemeyer & Risley

(57) ABSTRACT

The invention provides a method for Serial-Peripheral-Interface (SPI) data transmission. First, data stored in a first buffer of an SPI controller is transmitted to a second buffer of an SPI slave. A clock signal according to which the SPI slave operates is halted after data stored in the first buffer is completely transmitted. The first buffer is then refreshed with data newly received by the SPI controller while the clock signal is halted. The clock signal is then restarted to operate the SPI slave after the first buffer is refreshed. Refreshed data stored in the first buffer is then transmitted to the second buffer while the clock signal is oscillating. Halting of the clock signal, refreshing of the first buffer, restarting of the clock signal, and transmitting of refreshed data are repeated until the second buffer is full. The buffer size of the second buffer greatly exceeds that of the first buffer.

18 Claims, 5 Drawing Sheets

SYSTEM AND METHOD FOR SERIAL-PERIPHERAL-INTERFACE DATA TRANSMISSION

BACKGROUND OF THE INVENTION

1. Field of the Invention

The invention relates to data transmission, and more particularly to Serial-Peripheral-Interface (SPI) data transmission.

2. Description of the Related Art

FIG. 1 is a block diagram of a conventional system 100 for Serial-Peripheral-Interface (SPI) data transmission. System 100 includes an SPI controller 110 and an SPI slave 120. The SPI controller 110 is also referred to as an SPI master. After the SPI controller 110 receives data from a Peripheral Component Interconnect (PCI) bus, the SPI controller 110 transmits the received data to the SPI slave 120 according to SPI standard.

A data signal, a clock signal, and a chip select signal are transmitted between the SPI controller 110 and the SPI slave 120. The data signal comprises data transmitted from the SPI controller 110 to the SPI slave 120 according to SPI standard. The SPI slave 120 operates according to the clock signal, and operation of the SPI slave 120 is suspended if the clock signal is halted. The SPI controller 110 may control multiple SPI slaves and must specify the SPI slave 120 as the transmission target in advance. Thus, the SPI controller 110 enables the chip select signal to select the SPI slave 120 before data transmission between the SPI controller 110 and the SPI slave 120 is started.

The SPI controller 110 includes a buffer 112, and the SPI slave 120 includes a buffer 122 and a memory 124. FIG. 2 is a schematic diagram of signals communicated between the SPI controller 110 and the SPI slave 120 of FIG. 1. The SPI controller 110 first enables the chip select signal corresponding to the SPI slave 120, as shown by mark 210 of FIG. 2. The SPI controller 110 first stores data received from a PCI bus in the buffer 112. The SPI controller 110 then transmits an access command 202 and an address 204 through the data signal, wherein the access command 202 may be a write command and the address 204 specifies the writing address of data.

The SPI controller 110 then outputs data stored in the buffer 112 to the SPI slave 120 through the data signal 206. When the SPI slave 120 receives the data output by the SPI controller 110, the SPI slave 120 temporarily stores the received data in the buffer 122. When the SPI controller 110 estimates that the buffer 122 of the SPI slave 120 is full or when the SPI controller 110 wants to end the transmission, the SPI controller 110 disables the chip select signal, as shown by mark 220 in FIG. 2. When the chip select signal is disabled, the SPI slave 120 moves data stored in the buffer 122 to a memory 124 thereof. Thus, a data-transmission cycle between the SPI controller 110 and the SPI slave 120 is complete.

The SPI slave 120 stores data of the buffer 122 into the memory 124 when the SPI controller 110 disables the chip select signal. Storing data into memory 124, however, requires time and delays data transmission. Thus, the SPI controller 110 disables the chip select signal when the buffer 122 of the SPI slave 120 is full to save the transmission time. To fill the buffer 122 of the SPI slave 120 in one data-transmission cycle, the size of the buffer 112 of the SPI controller 110 is the same as that of the buffer 122 of the SPI slave 120. The buffer sizes of the buffers 112 and 122 are both assumed to be 256 bytes. If the SPI controller 110 disables the chip select signal when 1-byte data is transmitted, the transmission of 256-byte data requires 211.98 seconds. If the SPI controller 110 disables the chip select signal after 256-byte data is transmitted to fill the buffer 122 of the SPI slave 120, transmission of 256-byte data only takes 2.58 seconds.

Although the buffer sizes of the buffers 112 and 122 are the same, the conventional SPI data transmission still presents some drawbacks, such as the larger the memory 124 of the SPI slave 120 is, the larger the buffer 122 is required. It means an SPI controller 110 should comply with a buffer of the same size. In other words, SPI slaves with buffers of different sizes require different SPI controllers with buffers of different sizes for data transmission, and an SPI controller with fixed buffer size cannot control multiple SPI slaves with buffers of different sizes. If an SPI controller 110 controls an SPI slave 120 with a buffer size exceeding that of the SPI controller, the SPI controller 110 enables the chip select signal when data of the buffer 112 is completely transmitted, but the transmitted data cannot fill the buffer 122 of the SPI slave 120, causing extra delays in data transmission. Thus, a method for solving the problem of SPI data transmission is required.

BRIEF SUMMARY OF THE INVENTION

The invention provides a method for Serial-Peripheral-Interface (SPI) data transmission. The method includes transmitting data stored in a first buffer of an SPI controller to a second buffer of an SPI slave; halting a clock signal according to which the SPI slave operates after data stored in the first buffer is completely transmitted; refreshing the first buffer with data newly received by the SPI controller while the clock signal is halted; restarting the clock signal to operate the SPI slave after the first buffer is refreshed; transmitting of refreshed data stored in the first buffer to the second buffer while the clock signal is oscillating; then repeating halting the clock signal after the refreshed data stored in the first buffer is completely transmitted, refreshing of the first buffer, restarting of the clock signal, and transmitting of refreshed data until the SPI controller completes the transmission of all data or the second buffer is full. The buffer size of the second buffer greatly exceeds the size of the first buffer.

The invention also provides a system for Serial-Peripheral-Interface (SPI) data transmission. The system comprises an SPI slave and an SPI controller. The SPI slave comprises a second buffer and operates according to a clock signal. The SPI controller transmits data stored in a first buffer thereof to the second buffer of the SPI slave, halts the clock signal after data stored in the first buffer is completely transmitted, refreshes the first buffer with data newly received while the clock signal is halted, restarts the clock signal to operate the SPI slave after the first buffer is refreshed, transmits refreshed data stored in the first buffer to the second buffer while the clock signal is oscillating, and repeats halting of the clock signal, refreshing of the first buffer, restarting of the clock signal, and transmitting of refreshed data until the SPI controller completes the transmission of all data or the second buffer is full. The buffer size of the second buffer greatly exceeds the size of the first buffer.

The invention provides a method for Serial-Peripheral-Interface (SPI) data transmission. A chip select signal selecting an SPI slave is first enabled. A clock signal according to which the SPI slave operates is then repeatedly halted by a constant interval. A first buffer of an SPI controller is then refreshed with data newly received while the clock signal is halted. Data stored in the first buffer is then transmitted to a second buffer of the SPI slave while the clock signal is oscillating. If the second buffer is full or all data transmission from the SPI controller to the SPI slave is completed, the chip select signal is then disabled to move data stored in the second buffer to a memory of the SPI slave. The buffer size of the second buffer is much exceeding the size of the first buffer.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
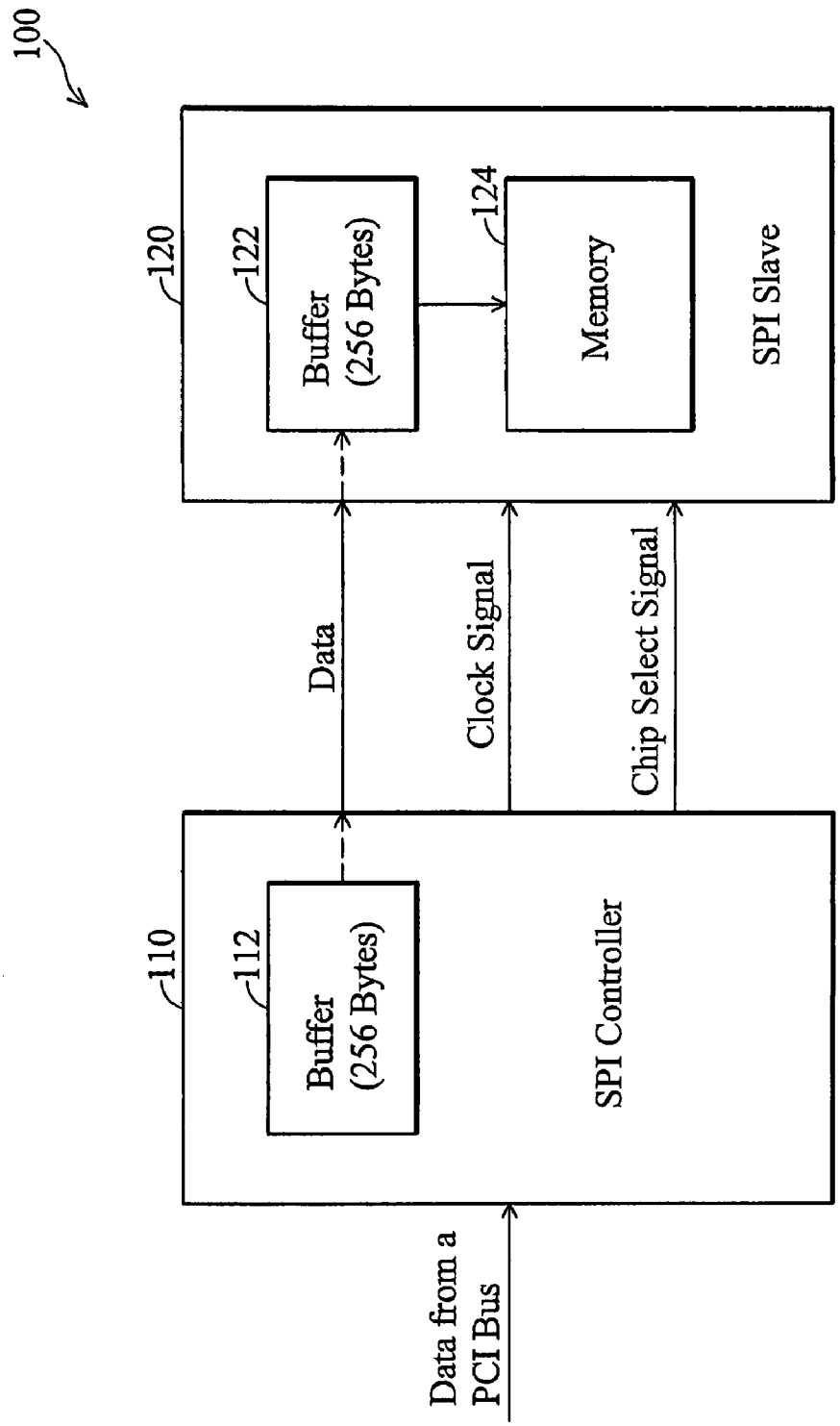
FIG. 1 is a block diagram of a conventional system 100 for SPI data transmission.
Figure 2:
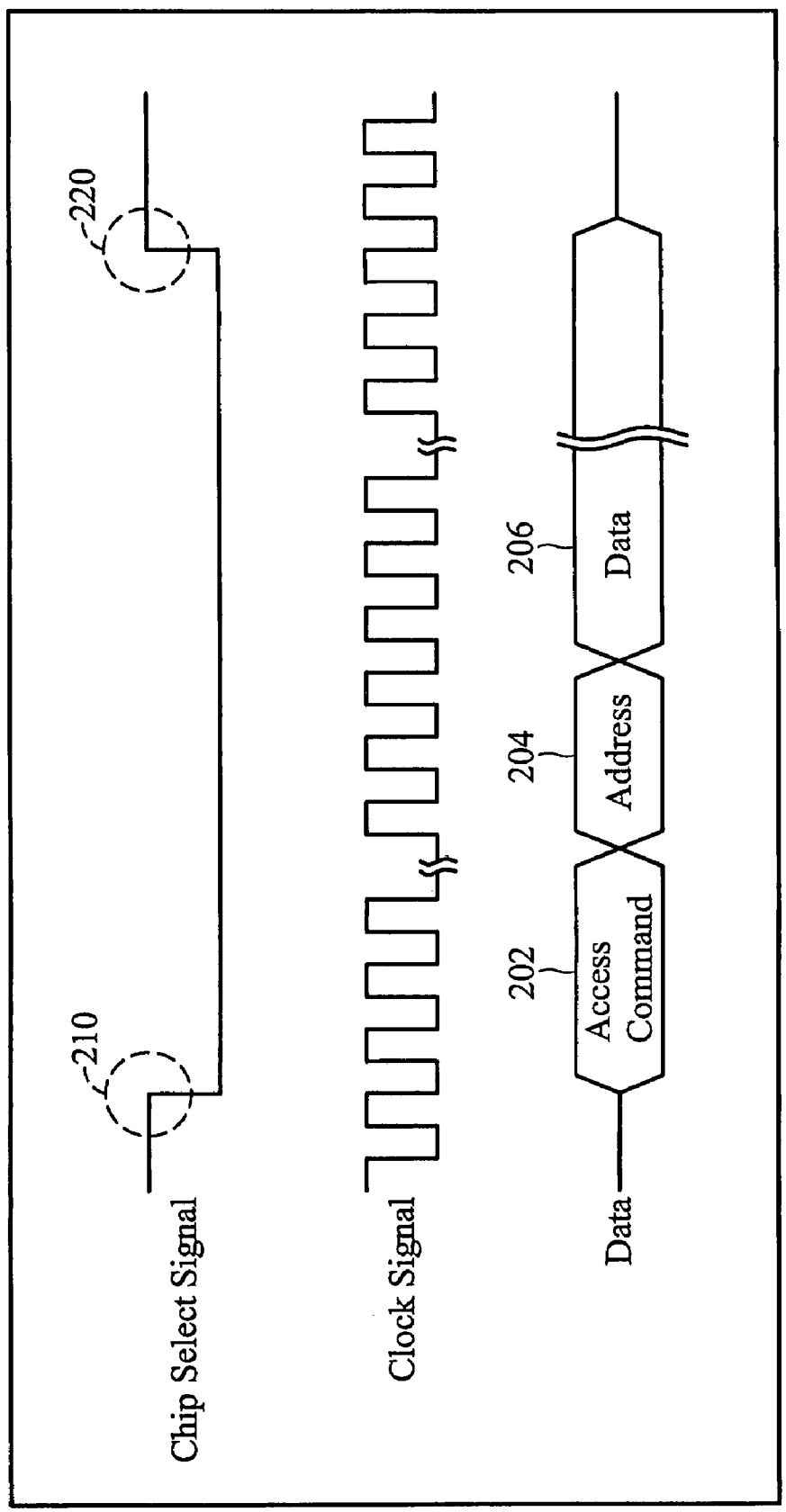
FIG. 2 is a conventional schematic diagram of signals communicated between an SPI controller and an SPI slave of FIG. 1.
Figure 3:
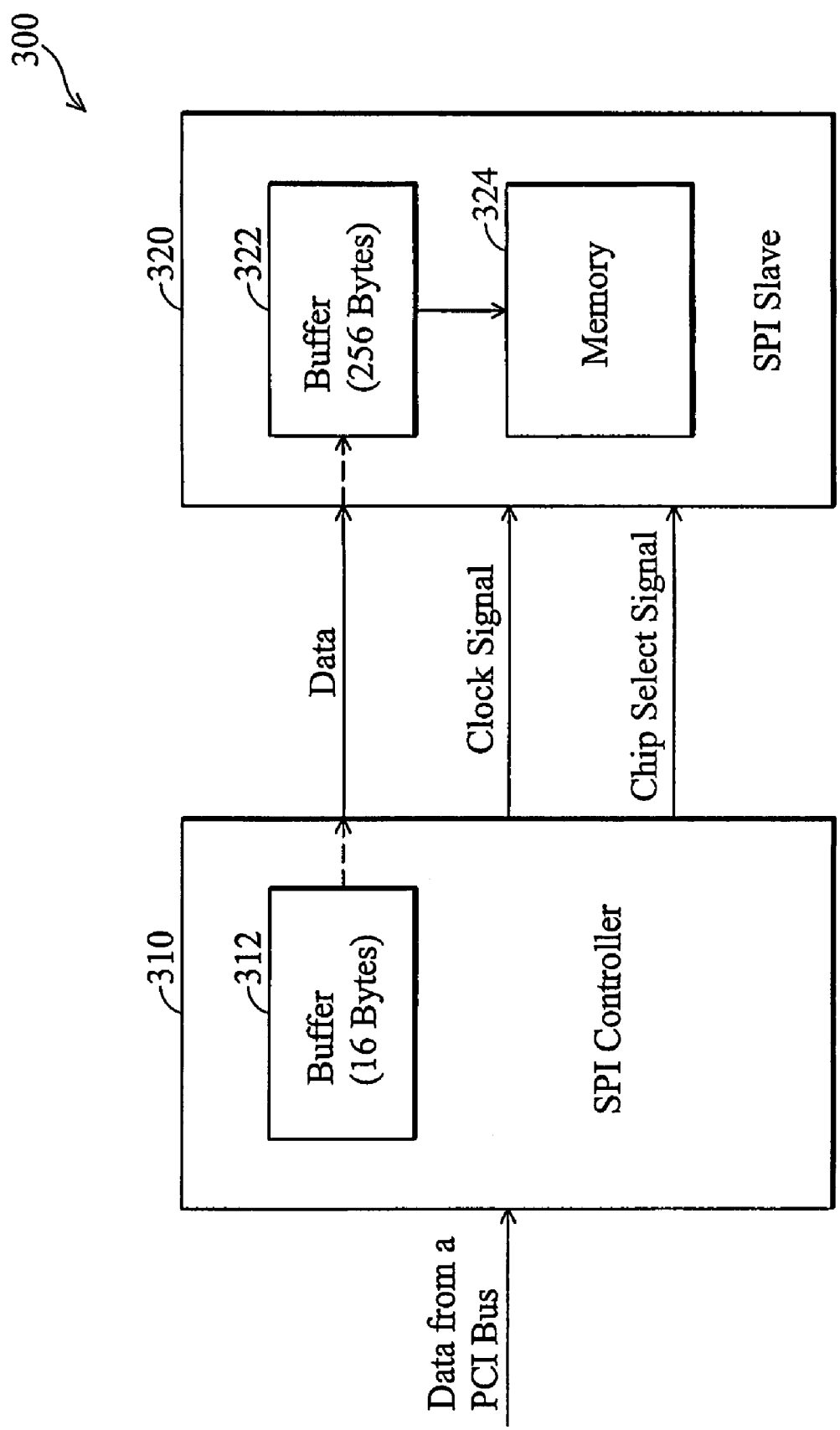
FIG. 3 is a block diagram of a system for SPI data transmission according to the invention.

FIG. 3 is a block diagram of a system 300 for Serial-Peripheral-Interface (SPI) data transmission according to the invention. The system 300 includes an SPI controller 310 and an SPI slave 320. After receiving data from a Peripheral Component Interconnect (PCI) bus, the SPI controller 310 implements transmission of received data to the SPI slave 320. The SPI slave 320 operates according to a clock signal.

The SPI controller 310 includes a buffer 312. The SPI slave 320 includes a buffer 322 and a memory 324, wherein the size of the buffer 322 greatly exceeds the size of the buffer 312. In one embodiment, the size of the buffer 312 is $2^I$ bytes, the size of the buffer 322 is $2^J$ bytes, and the size of the buffer 322 is $2^{(J-I)}$ times of the size of the buffer 312, wherein I and J are natural numbers. For example, the size of the buffer 322 is 256 bytes, while the size of the buffer 312 can only be 16 bytes, and the size of the buffer 322 is 16 times the size of the buffer 312.

Figure 4:
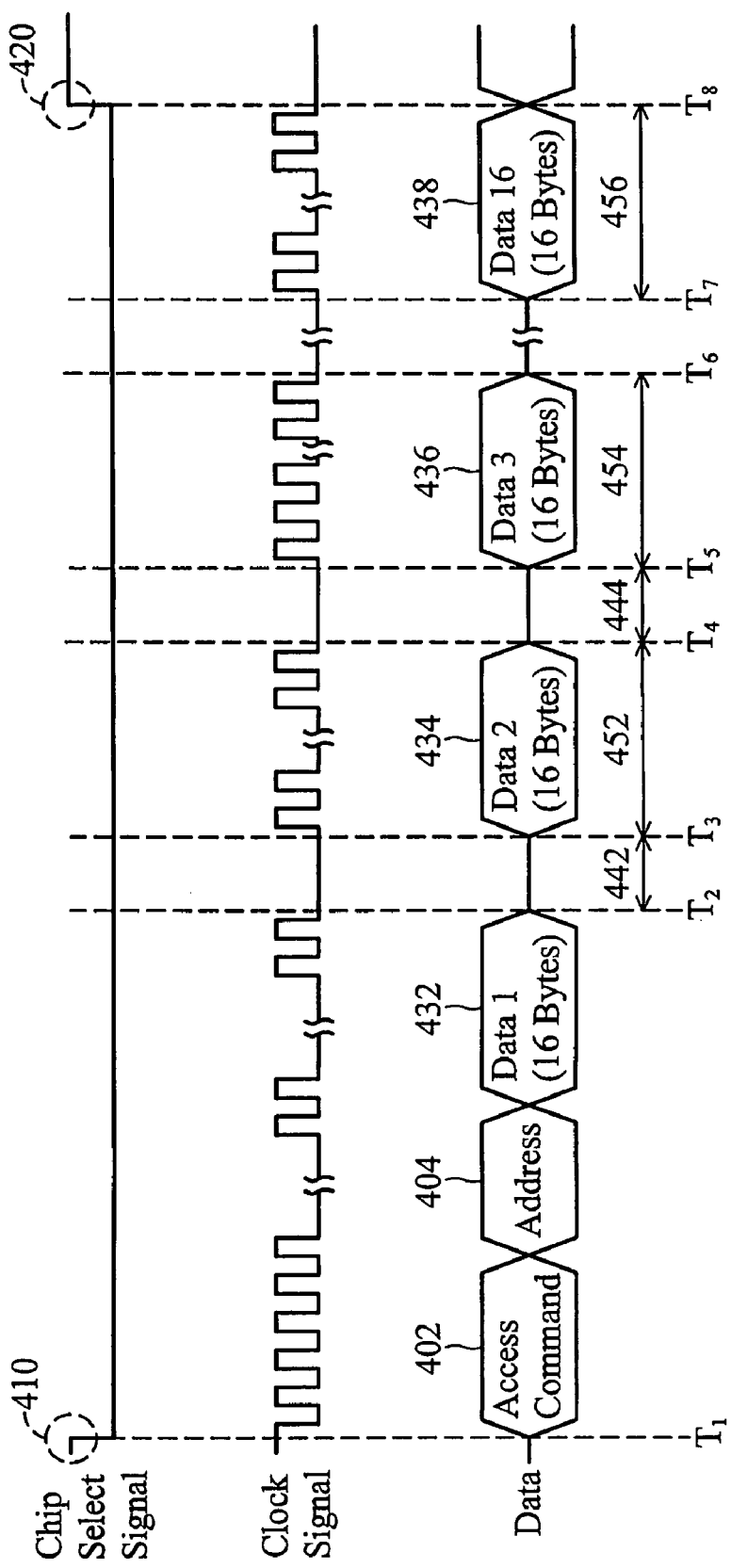
FIG. 4 is a schematic diagram of signals transmitting between an SPI controller and an SPI slave of FIG. 3 according to the invention.

FIG. 4 is a schematic diagram of signals transmitting between the SPI controller 310 and the SPI slave 320 according to the invention. The SPI controller 310 first enables a chip select signal corresponding to the SPI slave 320 at time $T_1$, as shown by mark 410 of FIG. 4. Thus, the SPI slave 320 is selected from the multiple SPI slaves controlled by the SPI controller 310 as the data transmission target. After the SPI controller 310 receives 16-byte data from a PCI bus, it stores the received data in the 16-byte buffer 312. Then the SPI controller 310 transmits an access command 402 and an address 404 to the SPI slave 320, wherein the access command 402 is write command and the address 404 specifies the writing address of the data. Then the 16-byte data 432 is then transmitted to the SPI slave 320, which stores the received 16-byte data in the 256-byte buffer 322. When the 16-byte data is completely transmitted at time $T_2$, the SPI controller 310 halts the clock signal. Thus, the SPI salve 320 does not operate while the clock signal is halted just like the clock signal does not oscillate anymore during T2 and T3, and the SPI controller 310 starts to refresh the buffer 312 with new data received from the PCI bus. It is assumed that the SPI controller 310 finishes the refreshment at time $T_3$, then the clock signal does not oscillate during $T_2$ and $T_3$, thus the SPI salve 320 stops operating as shown in FIG. 4.

When the buffer 312 is completely refreshed at time $T_3$, the SPI controller 310 restarts the clock signal and the SPI slave 320 continues to operate at time $T_3$. Because the SPI slave 320 operates after the clock signal restarts, the SPI controller 310 can transmit refreshed data of the buffer 312 to the buffer 322 of the SPI slave 320 at time $T_3$. When the SPI controller 310 has completely transmitted the refreshed data at time $T_4$, the SPI controller 310 halts the clock signal again to stop operation of the SPI slave 320. The SPI controller 310 then receives new data from the PCI bus to refresh data content of the buffer 312. Halting of the clock signal, refreshing of the buffer 312, restarting of the clock signal and transmitting of the data are recursively repeated until the SPI controller completes the transmission of all data or the buffer 322 of the SPI slave 320 is full. Because the size of the buffer 322 is 256 bytes and the size of the buffer 312 is 16 bytes, the buffer 322 is full after the 16th data transmission cycle.

When the SPI controller 310 determines that the buffer 322 of the SPI slave 320 is full, or the SPI controller 310 has no more data for transmission, the SPI controller 310 disables the chip select signal at time $T_8$, as shown by the mark 420 of FIG. 4. When the SPI slave 320 detects that the chip select signal is disabled, it moves data stored in the buffer 322 to the memory 324. Thus, one data transmission cycle between the SPI controller 310 and the SPI slave 320 is completed.

The clock signal is repeatedly halted for constant intervals during a data transmission cycle, such as periods 442 and 444 of FIG. 4. While the clock signal does not oscillate, the buffer 312 of the SPI controller 310 is refreshed with data received from the PCI bus. While the clock signal oscillates, data stored in the buffer 312 is transmitted to the buffer 322 of the SPI slave 320. Because the frequency of PCI bus is 33 MHz and the size of the buffer 312 is 16 bytes, refreshing of the buffer 312 requires only 240 ns. Thus, the clock signal is halted for only a very short time, which could almost be ignored.

Because the buffer 312 of the SPI controller 310 is small, the SPI controller 310 can repeatedly transmit data to fill a buffer of an SPI slave 320, regardless of the buffer size of the SPI slave 320. When the buffer 322 of the SPI slave 320 is full, the chip select signal corresponding to the SPI slave 320 is disabled to move data of the buffer 322 into a memory 324 of the SPI slave 320. Thus, the frequency of moving data from the buffer 322 to the memory 324 is reduced to the lowest to reduce delay of transmission. Additionally, the SPI controller 310 can control SPI slaves with buffers of different sizes, and a system designer is not required to design multiple SPI controllers with buffers of different sizes for controlling the multiple SPI slaves with buffers of different sizes.

Figure 5:
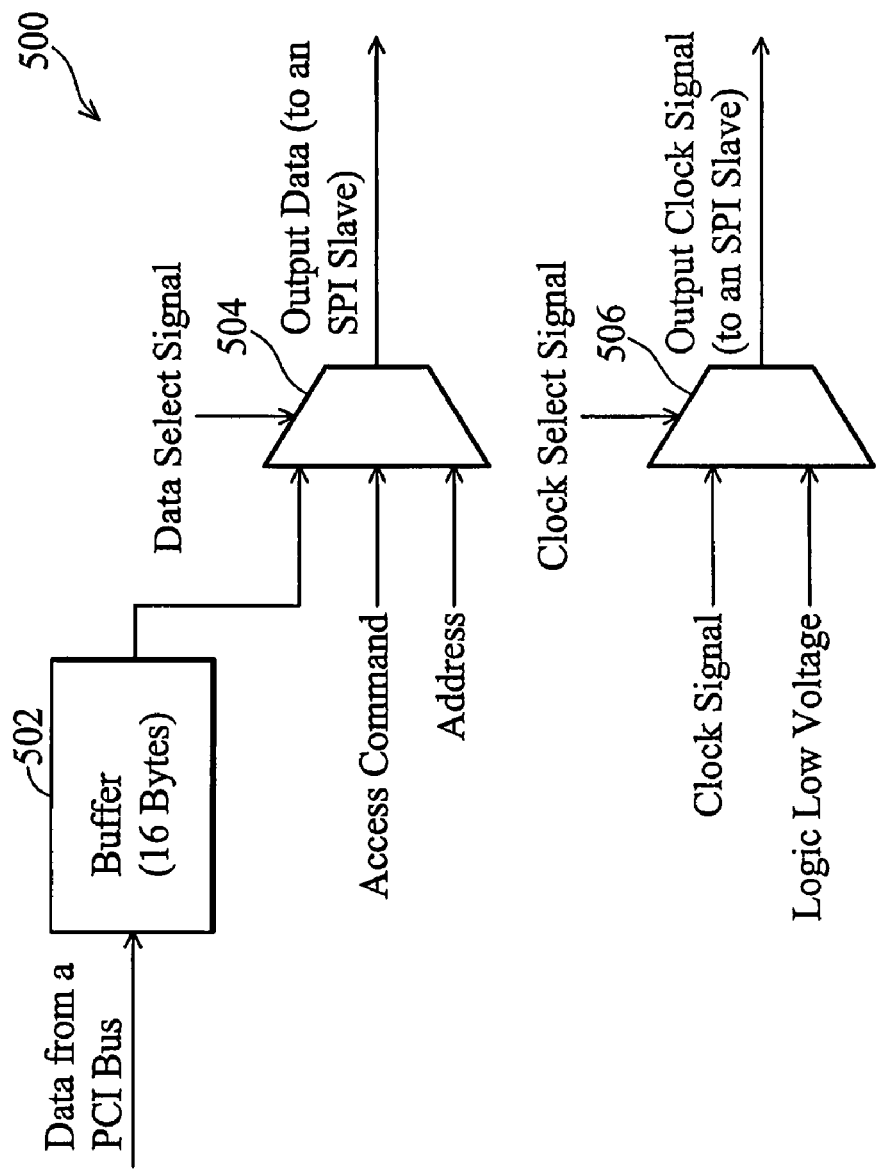
FIG. 5 is a block diagram of a portion of an SPI controller according to the invention.

FIG. 5 is a block diagram of a portion of an SPI controller 500 according to the invention. Data received from a PCI bus is first stored into a buffer 502. When the SPI controller 500 intends to output data signals, a MUX 504 is used to select which of an access command, an address, or data stored in the buffer 502 is output to an SPI slave as a data signal according to a data select signal. When the SPI controller 500 intends to halt a clock signal of the SPI slave, a MUX 506 is used to select which of an oscillating clock signal or a logic low voltage is output to the SPI slave as the clock signal according to a clock select signal. If the logic low voltage is selected, the clock of the SPI slave is halted.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for Serial-Peripheral-Interface (SPI) data transmission, comprising:
   enabling a chip select signal received by a SPI slave;
   transmitting data stored in a first buffer of an SPI controller to a second buffer of the SPI slave;
   halting a clock signal after data stored in the first buffer is completely transmitted;
   refreshing the first buffer with data newly received by the SPI controller while the clock signal is halted;
   restarting the clock signal to operate the SPI slave after the first buffer is refreshed;
   transmitting refreshed data stored in the first buffer to the second buffer while the clock signal is oscillating; and
   disabling the chip select signal after the second buffer is full to direct the SPI slave to store data of the second buffer into a memory of the SPI slave.

2. The method as claimed in claim 1, wherein the method further comprises:
   repeating halting of the clock signal, refreshing of the first buffer, restarting of the clock signal, and transmitting of refreshed data until the second buffer is full.

3. The method as claimed in claim 1, wherein the buffer size of the second buffer exceeds that of the first buffer.

4. The method as claimed in claim 1, wherein the buffer size of the second buffer is M times that of the first buffer, wherein M is a natural number.

5. The method as claimed in claim 4, wherein the size of the first buffer is $2^I$ bytes, the buffer size of the second buffer is $2^J$ bytes, I and J are natural numbers, and M equals to $2^{(J-I)}$.

6. The method as claimed in claim 1, wherein the clock signal and the chip select signal are both sent from the SPI controller to the SPI slave.

7. The method as claimed in claim 1, wherein the SPI controller receives data from a Peripheral Component Interconnect (PCI) bus to refresh the first buffer.

8. The method as claimed in claim 1, wherein the clock signal is halted by being pulled down to a logic low voltage.

9. A system for Serial-Peripheral-Interface (SPI) data transmission, comprising:
   an SPI slave, comprising a second buffer and operating according to a clock signal;
   an SPI controller coupled to the SPI slave, enabling a chip select signal received by the SPI slave, transmitting data stored in a first buffer thereof to the second buffer of the SPI slave, halting the clock signal after data stored in the first buffer is completely transmitted, refreshing the first buffer with data newly received while the clock signal is halted, restarting the clock signal to operate the SPI slave after the first buffer is refreshed, and transmitting refreshed data stored in the first buffer to the second buffer while the clock signal is oscillating, and disabling the chi select signal after the second buffer is full to direct the SPI slave to store data of the second buffer into a memory of the SPI slave.

10. The system as claimed in claim 9, wherein the buffer size of the second buffer exceeds that of the first buffer.

11. The system as claimed in claim 9, wherein the size of the first buffer is $2^I$ bytes, the buffer size of the second buffer is $2^J$ bytes, the buffer size of the second buffer is M times that of the first buffer and M equals to $2^{(J-I)}$.

12. The system as claimed in claim 9, wherein the SPI controller receives data from a Peripheral Component Interconnect (PCI) bus to refresh the first buffer.

13. The system as claimed in claim 9, wherein the SPI controller further comprises a first multiplexer for selecting an access command, an address and data from the first buffer according to a data select signal.

14. The system as claimed in claim 9, wherein the SPI controller further comprises a second multiplexer for selecting the clock signal and a logic low voltage according to a clock select signal.

15. A method for Serial-Peripheral-Interface (SPI) data transmission, comprising:
   enabling a chip select signal to select an SPI slave;
   repeatedly halting a clock signal according to which the SPI slave operates by a constant interval;
   refreshing a first buffer of an SPI controller with data newly received while the clock signal is halted;
   transmitting data stored in the first buffer to a second buffer of the SPI slave while the clock signal is oscillating; and
   disabling the chip select signal if the second buffer is full or all data transmission from the SPI controller to the SPI slave is completed to move data stored in the second buffer to a memory of the SPI slave.

16. The method as claimed in claim 15, wherein the SPI controller receives data from a Peripheral Component Interconnect (PCI) bus to refresh the first buffer.

17. The method as claimed in claim 15, wherein the clock signal is halted by being pulled down to a logic low voltage.

18. The system as claimed in claim 9, wherein the SPI controller repeats halting of the clock signal, refreshing of the first buffer, restarting of the clock signal, and transmitting of refreshed data until the second buffer is full.

* * * * *